United States Patent [19]

Sisco

[11] 3,911,681

[45] Oct. 14, 1975

[54] CONTROL MEANS FOR A TWO-STAGE SERVOMOTOR

[75] Inventor: William C. Sisco, South Bend, Ind.

[73] Assignee: The Bendix Corporation, South Bend, Ind.

[22] Filed: June 20, 1974

[21] Appl. No.: 481,433

[52] U.S. Cl. ................................. 60/553; 60/556
[51] Int. Cl.² ......................................... F15B 7/00
[58] Field of Search ............ 60/553, 562, 556, 576; 91/391 R

[56] References Cited
UNITED STATES PATENTS

| | | | |
|---|---|---|---|
| 3,062,011 | 11/1962 | Brooks | 60/576 X |
| 3,293,849 | 12/1966 | Smith | 60/553 |
| 3,350,882 | 11/1967 | Leising | 60/553 |
| 3,698,190 | 10/1972 | Miyai | 60/562 |

Primary Examiner—Martin P. Schwadron
Assistant Examiner—H. Burks, Sr.
Attorney, Agent, or Firm—Leo H. McCormick, Jr.; William N. Antonis

[57] ABSTRACT

A control valve is actuated by a first plunger upon movement of an input push rod to create a pressure differential across a movable wall which produces an output force. The output force is transmitted from the wall to move a stepped diameter piston, the larger diameter of which develops a first pressure force for operating the wheel brakes of a vehicle. When the input force from an operator exceeds the first pressure force, movement of a second plunger interrupts the communication of the first pressure force to the wheels to permit the output force from the wall to further move the stepped diameter piston so that a smaller diameter thereof develops a second pressure force.

12 Claims, 5 Drawing Figures

CONTROL MEANS FOR A TWO-STAGE SERVOMOTOR

BACKGROUND OF THE INVENTION

In U.S. Pat. No. 3,559,406, incorporated herein by reference, it is disclosed how concentric pistons could be utilized within a servomotor to develop an increased output when the desired braking force exceeds that which can be generated by the pressure differential acting across a wall in the servomotor. The concentric pistons are simultaneously moved by the pressure differential created within the servomotor unitl vacuum runout occurs, after which one of the pistons move independently of the other in response to a manual input to supply the master cylinder with an additional operational force. However, the additional operational force will act on both the first and second concentric pistons to reduce the effect of the manual input since the reactionary force of the pistons has to be overcome by the manual input before the output of the master cylinder is increased.

In copending U.S. application Ser. No. 481,434, it is disclosed how the movement of the second piston could actuate a valve to lock the first piston in a stationary position upon independent movement of the second piston to obtain a maximum direct output force from the input force.

In copending U.S. application Ser. No. 481,435, it is disclosed how a first pressure force developed by the simultaneous movement of the concentric pistons in response to an operational pressure differential across a wall can be modified upon the independent movement of a single piston which closes a first valve and opens a second valve to allow the first pressure force to proportionally escape to a relief chamber as the output from the wall is transferred to the second piston for the development of a second pressure force.

SUMMARY OF THE INVENTION

I have devised a power braking system wherein a stepped diameter piston means having a first diameter surface located within a first diameter chamber and a second diameter surface located in a second diameter chamber of a bore of a master cylinder is moved by pressure differential created across a wall to produce an output force. This output force develops a first pressurizing force when the first diameter surface moves in the first diameter bore. The first pressurizing force is communicated through an axial passageway in the stepped diameter piston means to the second diameter chamber. A control valve means located in the axial passage separates a first radial passage in the first diameter chamber from a second radial passage connected to a relief chamber. A plunger means is connected through a reaction disc to a control plunger which regulates the development of the pressure differential across the wall. The first pressurizing force acts on the plunger means to balance the input force applied to the control plunger and permit free communication between the first diameter chamber and the second diameter chamber in a first mode of operation. When the input force exceeds the first pressurizing force, the plunger means will sequentially move and operate a first valve which terminates the communication through the first radial passage to the second diameter chamber and proportionally open a second valve in the second radial passage to permit the first pressurizing force to escape into the relief chamber. This will allow the wall to move the second diameter surface in the second diameter chamber and create a second pressurizing force.

It is therefore the object of this invention to provide a power braking system having a control means for shifting the output force of a movable pressure differential responsive wall from acting on a first diameter to a second diameter of the stepped diameter piston when the input force exceeds a first pressure force developed by the movement of the first piston to develop a second pressure force for operating the wheel brakes of a vehicle.

It is another object of this invention to provide a servomotor with a plunger operated by an input force transmitted through a reaction means for sequentially closing a first valve and opening a second valve to transfer the development of an operational fluid pressure from a first diameter to a second diameter of a stepped diameter piston to provide a master cylinder with an added output potential.

It is another object of this invention to provide a pressurizing piston for a master cylinder with a control means responsive to a reaction sensor in a servomotor for proportionally transferring the output force from a movable pressure differential responsive wall from acting through a first diameter to a second diameter of the stepped diameter piston in response to an input force exceeding the operational force developed by the movement of the first diameter in a chamber in the master cylinder.

It is another object of this invention to provide a servomotor with a control means for sequentially terminating the development of a first fluid pressure by a first diameter on a piston and commencing the proportional development of a second fluid pressure by a second diameter on the piston as a function of the differential between the operational input force and the first fluid pressure.

BRIEF DESCRIPTION OF THE DRAWINGS

FIG. 4 is another embodiment of a control means for the servomotor in the braking system of FIG. 1 having a ball valve for terminating communication of pressurized fluid between a first chamber and a second chamber and a poppet valve for commencing communication of pressurized fluid between the first chamber and a relief chamber in response to an operational input force.

FIG. 5 is a graph showing the relationship between the input force supplied the servomotor in FIG. 1 and the output force to the wheel brakes.

DETAILED DESCRIPTION OF THE PREFERRED EMBODIMENT

Figure 1:
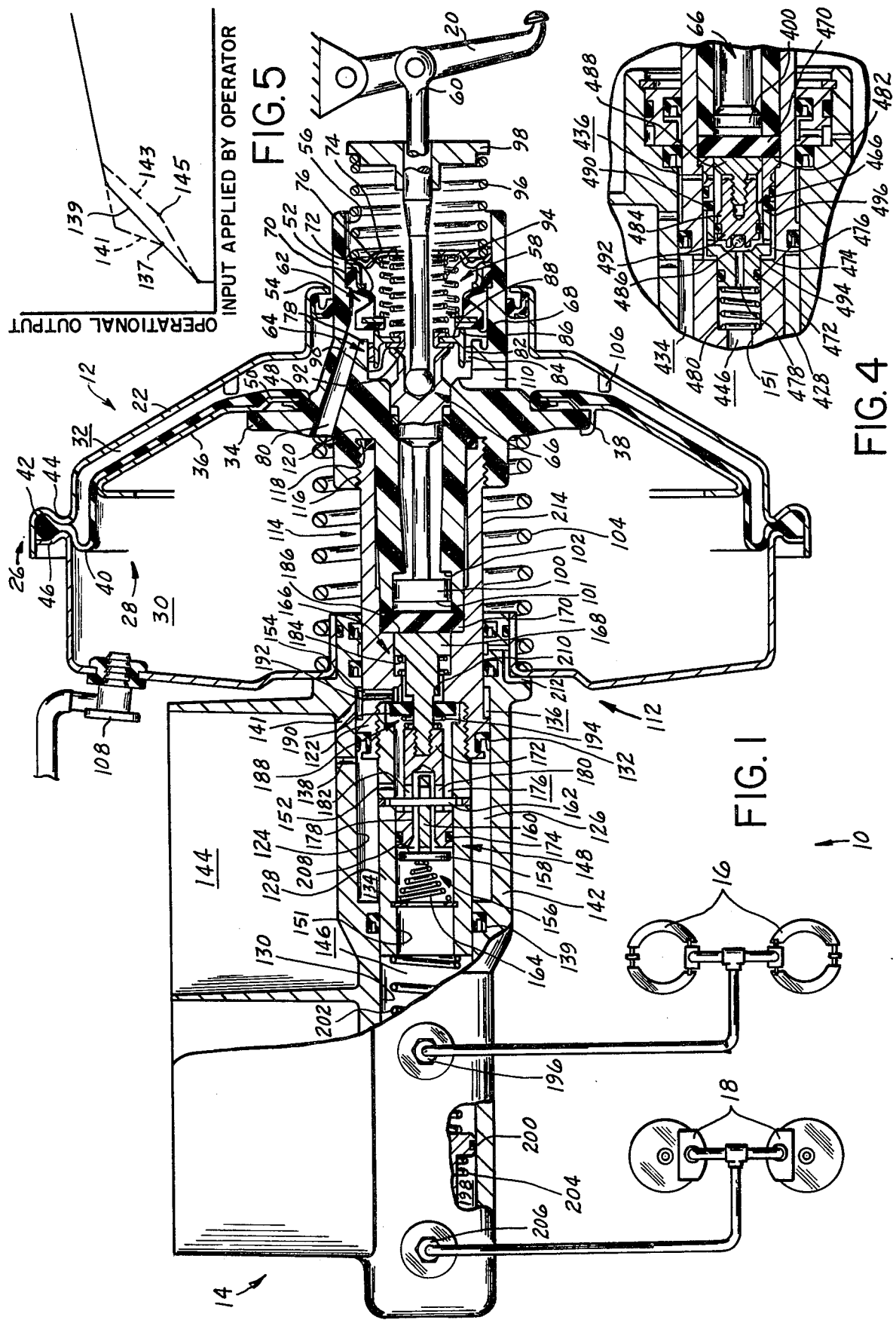
FIG. 1 is a schematic illustration of a power braking system with a sectional view of a servomotor for proportionally transferring the output force of a pressure differential wall from a first area to a second area and thereby modifying the operational force through which the brakes are applied in response to an input force.

The braking system 10, shown in FIG. 1, has a fluid pressure servomotor 12 connected to a master cylinder 14 for supplying the front wheel brakes 16 and the rear wheel brakes 18 with an operational hydraulic force in response to an input force applied to pedal 20 by an operator.

The fluid pressure servomotor 12 has a first shell 22 joined to a second shell 24 by a twist lock arrangement 26. A movable wall means 28 is located within the first shell 22 and the second shell 24 to form a first variable volume chamber 30 and a second variable volume chamber 32. The wall means 28 has a central hub 34 to which a backing plate 36 is attached by fingers 38. A diaphragm 40 has a first bead 42 on its periphery which is held between flange 44 and flange 46 on the first shell 22 and the second shell 24, respectively, and a second bead 48 which is snapped onto lip 50 of the backing plate 36.

The hub 34 has a rearwardly extending projection 52 which extends through opening 54 in the first shell 22. The projection 52 has an axial bore 56 into which a control valve means 58 is located for supplying an operational input from pedal 20 through push rod 60.

The control valve means 58 has a vacuum poppet assembly 62 and an atmospheric poppet assembly 64 which are sequentially operated upon movement of plunger 66 by the push rod 60.

The vacuum poppet assembly 62 has a face 68 separated from a fixed bead 70 by a flexible section 72. The bead 70 is secured within bore 56 by a retainer 74 which surrounds the push rod 60. A first spring 76 urges the face 68 toward a vacuum seat 78 adjacent vacuum passage 80. The vacuum passage 80 connects the first chamber 30 with the interior 56 of the hub means 34.

The atmospheric poppet 64 has a cylindrical section 82 which is positioned within the bore 56 by a plurality of projections 84. The projections 84 guide a first atmospheric seat 86 into contact with face 68. An annular projection 88 extends inwardly from the cylindrical projection toward the push rod 60. One side of the projection 88 forms a second atmospheric seat 90 which is urged toward a rearward projection 92 on plunger 66 by spring 94 secured between retainer 74 and push rod 60. Another spring 96 is caged between retainer 74 and plate 98 to return and hold land 100 on plunger 66 against shoulder 102 in the hub means 34. A return spring 104 located in the second shell 24 acts on the hub means 34 to hold bumper 106 against shell 22. In this position vacuum that is communicated from the intake manifold of the vehicle through check valve 108 into the first chamber 30 will evacuate any air present in the second chamber 32 by way of passage 110 into bore 56 and out passage 80 to vacuum suspended wall means 28.

A ratio chamber means 112 has a piston means 114 secured to the hub 34 by a threaded connection 116 until end 118 abuts shoulder 120. The stepped diameter piston means 114 has a first diameter surface 122 which is located within a first diameter 124 of bore 126 in the master cylinder 14 and a second diameter surface 128 which extends into a second diameter 130 of the bore 126. A lip seal 132 on the first peripheral surface 122 of the piston means 114 separates the first diameter section 124 into a first pressurizing chamber 134 and a relief chamber 136. The first diameter section has a first port 138 and a second port 141 through the housing 142 to communicate reservoir 144 with the first pressurizing chamber 134 and the relief chamber 136, respectively. A lip seal 139 prevents communication between a second pressurizing chamber 146 along the second diameter surface 128. A control means 148 is located within axial passageway 151 of the piston means 114. A first radial passage 152 connects the first pressurizing chamber 134 with the axial passageway 151 and a second radial passage 154 connects the relief chamber 136 with the axial passageway 151.

A first valve means 156 consisting of a poppet member 158 having a stem 160 which is urged toward a pin 162 by a spring 164 controls the communication between the first pressurizing chamber 134 and the second pressurizing chamber 146 through the axial passageway 151. An actuator means 166 having a cylindrical section 168 which abuts a reaction disc 170 is attached to a sleeve member 172. A seal 174 is carried by a large diameter section of the sleeve member 172 in the axial passageway 151 to prevent communication between the control chamber 176 and the second pressurizing chamber 146 along the axial passageway 151. The sleeve member 172 has an axial bore 178 which loosely surrounds the stem 160 of the poppet 158. Pin 162 extends through a first slot 180 and a second slot 182 in the sleeve 172. A spring 184 acts on the cylindrical section 168 to hold face 186 against the reaction means 170.

A second valve means 188 has an annular poppet 190 which is held against a seat 192 by a spring 194 to prevent communication between the control chamber 176 and the relief chamber 136 in a first mode of operation when a pressure differential across wall 28 develops the operational output force to move the piston means 114 in the master cylinder.

The second pressurizing chamber 146 in the master cylinder 14 has a port 196 through which pressurized hydraulic fluid is communicated to the front wheel brakes 16. The master cylinder 14 has a third pressurizing chamber 198 separated by a piston 200 which is positioned within bore 130 by a first spring 202 in chamber 146 and spring 204 in chamber 198. Piston 200 is free to move within bore 130 during a brake application in response to the movement of the first piston means 114 in the second pressurization or expanding chamber 146 to equalize the operational pressure being transmitted to the wheel brakes while at the same time providing a full displacement of hydraulic operating fluid from chamber 198 through port 206 to the rear wheel brakes.

MODE OF OPERATION OF THE PREFERRED EMBODIMENT

When an operator applies an input force to pedal 20, push rod 60 will move to allow spring 76 to move face 68 of the vacuum poppet means 62 against vacuum seat 78 to interrupt communication between the first chamber 30 and bore 56 through passage 80. Further movement of the push rod 60 will move the first atmospheric seat 86 away from face 68 to allow air at atmospheric pressure present in bore 56 to enter the rear chamber 32 through passage 110. With air in the rear chamber 32 and vacuum in the front chamber 30, a pressure differential will be created across the wall means 28. This pressure differential will create an operational force which will be transmitted through the hub means 34 to move the first piston means 114 in bore 124 of the master cylinder 14. As the first piston means 114 moves, the first diameter surface 122 will move in the first diameter 124 to develop a first hydraulic pressure after the lip seal 132 has passed passage or first port 138. This first hydraulic pressure will be communicated through passage 152 into control chamber 176, out axial bore 178 and into the second pressurizing chamber 146 for communication to the wheel brakes 16. At the same time spring 202 and the fluid pressure in chamber 146 will move piston 200 to develop a corresponding hydraulic pressure in chamber 198 for operating the rear wheel brakes 18.

The first hydraulic pressure in the control chamber 176 will act on the cylindrical section 168 to balance the input force transmitted to the reaction means 170 through the cylindrical projection 100 of the plunger 66. As the operator increases the input force through the push rod, the pressure differential across wall means 28 will correspondingly increase until the rear chamber 32 is completely filled with air at atmospheric pressure commonly referred to as "vacuum runout". Any further input from the operator will be transmitted from plunger 66, through the reaction means 170 to move the cylindrical section 168 in opposition to spring 184 toward face 208 of the poppet 158 of the first valve means 148. As sleeve 172 is moved within the axial bore, spring 194 expands while spring 164 is compressed urging face 208 against the sleeve to terminate the communication of the first pressurized hydraulic fluid between the control chamber 176 and the second pressurizing chamber 146. Still further input force will cause the shoulder 210 on the actuator means 166 to engage and move the annular poppet 190 away from seat 192 to open or commence communication between the control chamber 176 and the relief chamber 136. With valve means 188 opened, the first hydraulic fluid pressure in the first chamber 134 will be reduced by being allowed to flow into the relief chamber to permit the operational pressure differential force acting through hub means 34 to move the second diameter surface 128 in the second pressurizing chamber 146 and supply the wheel brakes 16 and 18 with an increased operational output. Thus, by proportionally reducing the first hydraulic pressure in chamber 134 to that of the relief chamber 136, the entire pressure differential developed across walll means 28 can be shifted from acting in the first diameter surface area 122 to the second diameter surface area 128 to provide a braking system with a power modifying servomotor whose output is controlled by the input force from the operator.

Point 137 on line 139 in FIG. 5 illustrates the shift from the first mode of operation to the second mode of operation where the pistons both sides of the reaction means 170 have an equal diameter. This is a smooth transition indicating a balanced braking system. However, by changing the diameter of either piston or cylindrical sections 168 or 101 to account for parameters in the system, line 141 or line 143 will be produced. As point 145 illustrates, the slope of either the first stage or the second stage can be shifted depending upon the type of parameter which is to be corrected through the relationship of the input force to the output force.

A drain means 212 is located in the housing 142 for connecting the entrance of bore 126 with the atmosphere to provide an escape for any hydraulic fluid which may adhere to surface 214 from being communicated to the front chamber 30 of the servomotor 12.

Figure 2:
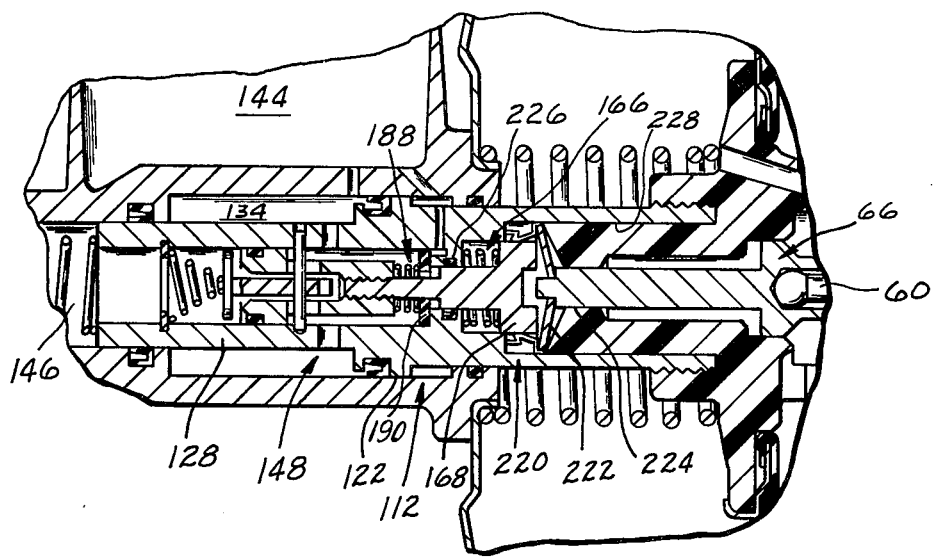
FIG. 2 is another embodiment of a control means for the servomotor of the braking system for FIG. 1 having a mechanical reaction means for transferring a physical indication to an operator of the operational force supplied the wheel brakes.
Figure 3:
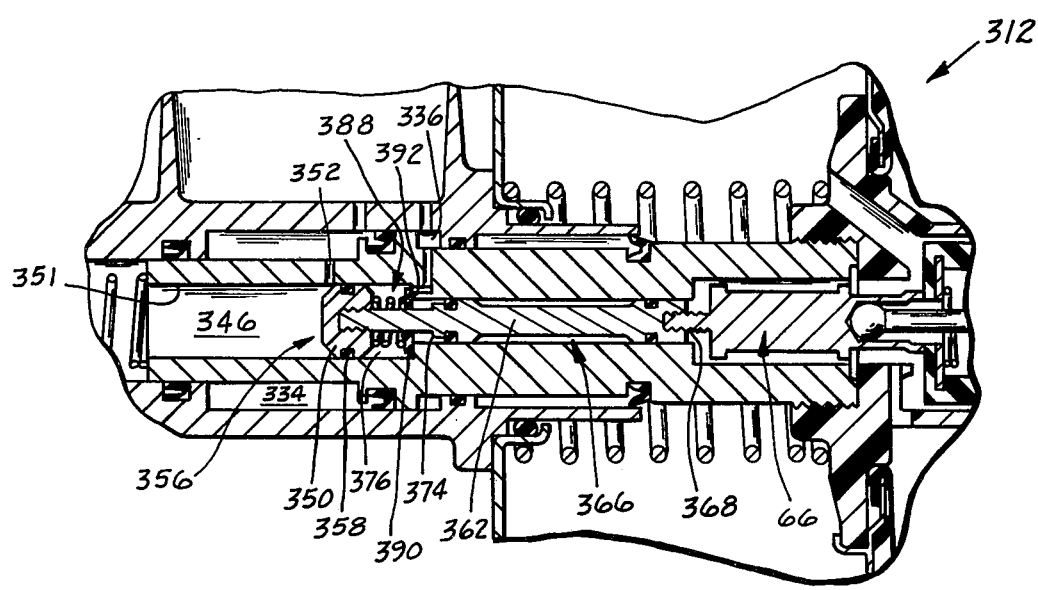
FIG. 3 is another embodiment of a control means for the servomotor in the braking system of FIG. 1 having an annular sliding valve for transmitting a reaction force to the operator to indicate the operational force developed for actuating the wheel brakes.

In the embodiments shown in FIGS. 2, 3 and 4 elements identical to those in FIG. 1 are not identified by numerals where they are in the same place with respect to the servomotor and master cylinder.

In FIG. 2 the ratio changer means 112 is the same as in FIG. 1, the change occurring in the reaction means 220 through which the pressure development in the master cylinder is communicated to the operator through push rod 60.

Reaction means 220 provides a mechanical feel to the operator through a series of radially arranged levers 222 which are located on the end 224 of the plunger 66 at the bottom of bore 228. The cylindrical section 168 of the actuator means 166 engages the levers 222 to provide a force which is indicative of the first fluid pressure developed in the first chamber 134 in the first mode of operation and the second fluid pressure developed in chamber 146 in the second mode of operation. A lip seal 226 prevents pressurized fluid from entering the reaction area as the servomotor is operated. When vacuum runout occurs, the end of the plunger 224 will directly engage the cylindrical section 168 to sequentially close the first valve means 148 and open the second valve means 188 to provide the proportional shifting of the operational force from the first diameter 122 to the second diameter 128.

In the embodiment shown in FIG. 3, the actuation means 366 is rigidly connected to the plunger 66 through adjustable connection 368. The first valve means 356 has a cylindrical body 350 which is located in the axial passageway 351 and rigidly attached to the stem 362 of the actuation means 366. A lip seal 358 is located on the peripheral surface of the cylindrical body 350 to prevent fluid communication from the axial passageway 351 into the control chamber 376. The second valve means 388 has an annular poppet 390 held against seat 392 by a resilient means or spring 394 to prevent communication between the control chamber 376 and the relief chamber 336.

When vacuum runout occurs in the servomotor 312, the input force from the operator sequentially moves plunger 66 to position seal 358 past passage 352, to close communications from the first pressurizing chamber 334 through the axial passageway 351 and open the second valve means 388. When shoulder 374 tilts the annular poppet 390 away from seat 392, the first hydraulic fluid pressure which is developed during the first mode of operation is proportionally reduced as a function of the input force applied to the brake pedal 20. Upon termination of the input force, return spring 96 will reposition the actuation means 366 in the axial passageway 351 to allow vacuum in chamber 30 to evacuate air from the rear chamber 32.

In the embodiment shown in FIG. 4, the actuator means 466 has a first sleeve 472 which is located in the axial passageway 151 adjacent a shoulder 474 in the control chamber 476. The first sleeve 472 has an axial bore 478 for establishing a flow path from the control chamber into the second pressurizing chamber 446. A resilient means 480 urges the first sleeve into contact with the annular poppet valve 490. A second sleeve 482 located in the control chamber 476 forms a guide surface for plunger 484. The annular poppet 490 is adjacent the end of the second sleeve 482. The plunger 484 has a first cylindrical end 488 which abuts the reaction disc in axial alingment with the head 400 of the plunger 66. A ball valve 486 is carried on end 492 of the plunger 484 to engage a seat 494 on the first sleeve 472.

As in FIG. 1, when vacuum runout occurs the input force applied to plunger 66 is directly transmitted through the reaction disc 470 to move the plunger 484 within the control chamber 476. Ball 486 will contact seat 494 and resilient means or spring 480 will hold the first sleeve tight against the plunger 484 to terminate communication between the control chamber 476 and chamber 446. Upon compression of spring 480 by the movement of the plunger 484, end 496 will move away from the second annular poppet 490 to allow the first hydraulic pressure in the first chamber 434 to be proportionally reduced by being communicated into the relief chamber 436. With the first hydraulic fluid pressure in chamber 434 reduced, the operational pressure differential force acting through hub means 34 will move the piston means 114 to pressurize the fluid in chamber 446 through the diameter surface 428 moving in the second diameter 430 to provide an increased output for operating the wheel brakes in the braking system 10.

Upon release or a reduction in the input force, the second hydraulic pressure in the second chamber 446 will act on ball 486 to move the plunger 484 against the reaction means 470 and the first sleeve 472 in conjunction with spring 480 against the annular poppet 490 to terminate communication between the control chamber 476 and the relief chamber 436. Since the hydraulic fluid in the first chamber 434 is at a reduced pressure, the second hydraulic fluid pressure is rapidly reduced to a level approaching the original first fluid pressure. As return spring 96 further moves plunger 66 to the release position, the vacuum poppet 62 again prevents air from entering the second chamber 32 to allow vacuum in the front chamber 30 to vacuum suspend the wall means 28.

Through the control means shown in FIGS. 1, 2, 3 and 4 it is possible to modify the output from a master cylinder 14 in a controlled manner to utilize the operational parameters of the servomotor in meeting the braking demands of an operator.

I claim:
1. In a power braking system having a servomotor for supplying an operational force to the wheel brakes upon movement of a wall means by a pressure differential acting thereacross in response to an input force from an operator in a first mode of operation, control means for modifying the operational force in response to an input force in a second mode of operation, said control means comprising:
 a housing having a bore therein having a first diameter connected to a reservoir by a first port and a second port and a second diameter connected to said wheel brakes;
 piston means fixed to said wall means having a first diameter surface located in the first diameter of the bore to form a first pressurizing chamber and a relief chamber therein and a second diameter surface located in the second diameter of the bore to form a second pressurizing chamber therein, said piston means having an axial passageway with a first radial passage for communicating the first pressurizing chamber with the second pressurizing chamber and a second radial passage for communicating the first pressurizing chamber with the relief chamber;
 first valve means located within the axial passageway for controlling communication therebetween with the second pressurizing chamber;
 second valve means located within the axial passageway for controlling communication therebetween with the relief chamber; and
 actuator means located within the axial passageway responsive to a first pressurizing force developed by the first diameter surface moving within the first diameter of said bore for maintaining the first valve means in an opened position to allow unrestricted communication through the first radial passage into the axial passageway and said second valve means in a closed position in said first mode of operation until said input force from the operator exceeds said first pressurizing force to permit the actuator means to move forward within the axial passage to initiate said second mode of operation by sequentially closing the first valve means to interrupt communication of the first pressurizing force to the second chamber and open the second valve means to proportionally reduce the first pressurizing force in the first chamber by establishing communication with the relief chamber as a function of the input force to allow the pressure differential across said wall means to correspondingly move the second diameter surface within the second diameter to establish a second pressurizing force for operating the wheel brakes.

2. In the power braking system, as recited in claim 1, wherein said acutator means includes:
 sleeve means located within said axial passageway for establishing a first flow path to the second pressurizing chamber in the first mode of operation, said sleeve means having a first slot and a second slot therein; and
 pin means secured through the first slot and the second slot to the second diameter surface of the piston means to permit relative movement between the sleeve means and the piston means in the development of a second flow path between said axial passageway and said relief chamber in the second mode of operation.

3. In the power braking system, as recited in claim 2, wherein said first valve means includes:
 first poppet means located within said axial passageway having a stem with a slot therein through which said pin means extends; and
 first resilient means for urging said first poppet means into contact with the pin means in the first mode of operation to allow the first pressurizing force to be freely communicated into the second chamber until said input force can move the sleeve into contact with the poppet means to terminate the communication along said first flow path and commence the second mode of operation.

4. In the power braking system, as recited in claim 3, wherein said second valve means includes:
 second poppet means located within said axial passageway adjacent said second radial passage; and second resilient means connected to said sleeve means for urging said second poppet means against seat surrounding the second passage in said first mode of operation until movement of the sleeve means by the input force sequentially moves the stem of the first poppet means away from the pin means in opposition to the first resilient means and the second poppet means away from said seat in opposition to the second resilient means during said second mode of operation.

5. In the power braking system, as recited in claim 4, wherein said actuator means includes:
reaction means located between said sleeve means and a plunger through which the input force is transmitted for providing the operator with an indication of the operational force supplied the wheel brakes.

6. In the power braking system, as recited in claim 1, wherein said actuator means includes:
first sleeve means located within said axial passageway for establishing a first flow path between said first radial passage and said second pressurizing chamber;
resilient means located within said axial passageway for urging said first sleeve means into engagement with the second valve means to prevent communication along said second radial passage through a second flow path;
plunger means located within said first sleeve means having a seal for separating the first radial passage from the second radial passage; and
reaction means located in said axial passageway between said plunger means and an input push rod, said plunger means communicating the first pressurizing force to the reaction means to oppose the input force transmitted through an input push rod in said first mode of operation, said input push rod moving in said reaction means to correspondingly move said first sleeve means to initiate said second mode of operation.

7. In the power braking system, as recited in claim 6, wherein said first valve means includes:
ball means located on said plunger means for engaging a seat on said first sleeve means to interrupt the communication of the first pressurizing force to commence the second mode of operation upon movement of the sleeve in response to the input force.

8. In the power braking system, as recited in claim 7, wherein said second valve means includes:
second sleeve means located in said axial passageway adjacent the reaction means for establishing said second flow path in the actuator means; and
poppet means located within said axial passageway between the first sleeve and the second sleeve for preventing said first pressurizing force from entering said second flow path in the first mode of operation and for allowing the first pressurizing force to be proportionally released in the second mode of operation.

9. In the power braking system, as recited in claim 8, wherein said housing includes:
drain means connected to the first periphery of the piston means for intercepting any fluid which may be transmitted from the bore toward the wall.

10. In the power braking system, as recited in claim 1, wherein said actuator means includes:
stem means connected to a first operational plunger in the servomotor and extending into the axial passageway for sequentially operating the first valve means and the second valve means to shift the output force from the wall acting on the first diameter surface to the second diameter surface in response to an input force exceeding the first pressurizing force developed by moving the piston means within the bore.

11. In the power braking system, as recited in claim 10, wherein said first valve means includes:
cylinder means located in said axial passageway having a seal for separating the first radial passage from the second radial passage, said cylinder means being connected to said stem means for controlling the communication of the first pressurizing force through the axial passageway as a function of the movement of the stem in response to the input force.

12. In the power braking system, as recited in claim 11, wherein said second valve means includes:
poppet means located in said axial passageway adjacent the second axial passage for preventing communication of said first pressurizing force from the axial passageway; and
resilient means located between said cylinder means and the poppet means for urging the poppet means toward a seat in opposition to said input force.

* * * * *